United States Patent
Browne et al.

(10) Patent No.: US 10,572,477 B2
(45) Date of Patent: Feb. 25, 2020

(54) SELECTION OF IMPLEMENTATION FOR QUERY EXECUTION

(71) Applicant: INTERNATIONAL BUSINESS MACHINES CORPORATION, Armonk, NY (US)

(72) Inventors: Jill Browne, Mulhuddart (IE); John McEvoy, Mulhuddart (IE); Kathleen Bridget Murray, Mulhuddart (IE); Mairéad O'Hanlon, Mulhuddart (IE)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 15/005,529

(22) Filed: Jan. 25, 2016

(65) Prior Publication Data

US 2017/0212932 A1    Jul. 27, 2017

(51) Int. Cl.
*G06F 17/30* (2006.01)
*G06F 16/2453* (2019.01)

(52) U.S. Cl.
CPC .............. *G06F 16/24542* (2019.01)

(58) Field of Classification Search
CPC ............... G06F 17/30469; G06F 16/24542
USPC ............................................. 707/720
See application file for complete search history.

(56) References Cited

U.S. PATENT DOCUMENTS

| | | | |
|---|---|---|---|
| 6,957,211 B1 | 10/2005 | Tyulenev et al. | |
| 7,281,000 B2 | 10/2007 | Kapoor et al. | |
| 7,877,374 B2 | 1/2011 | Zabback et al. | |
| 7,930,277 B2 | 4/2011 | Ge et al. | |
| 8,316,009 B2 * | 11/2012 | Fraser | G06F 17/30469 |
| | | | 702/180 |
| 8,606,804 B2 | 12/2013 | Merz et al. | |
| 2008/0133458 A1* | 6/2008 | Zabback | G06F 17/30469 |
| 2008/0228716 A1* | 9/2008 | Dettinger | G06F 17/30923 |
| 2009/0106219 A1* | 4/2009 | Belknap | G06F 17/30469 |
| 2010/0125565 A1* | 5/2010 | Burger | G06F 17/30433 |
| | | | 707/713 |
| 2014/0358894 A1* | 12/2014 | Wei | G06F 17/30442 |
| | | | 707/713 |
| 2015/0039586 A1* | 2/2015 | Kerschbaum | G06F 16/24542 |
| | | | 707/718 |

FOREIGN PATENT DOCUMENTS

EP    1193618 A2    4/2002

OTHER PUBLICATIONS

Oracle, "Query Optimizer Concepts," downloaded from internet Jan. 15, 2016, pp. 1-24.

* cited by examiner

*Primary Examiner* — Hicham Skhoun
(74) *Attorney, Agent, or Firm* — Heslin Rothenberg Farley & Mesiti P.C.; Alexander Jochym, Esq.

(57) ABSTRACT

Selecting at least an implementation for executing a query. In response to a query run request in respect of a given query, accessing query execution data comprising implementations and their respective performance records for executing the given query in a given context. The query execution data is assessed, and at least an implementation is selected on a basis of its respective performance record to execute the given query in at least a current context.

15 Claims, 4 Drawing Sheets

Personalization Editor

| View Rule | Preview | Document Info |

Home-ActionRule

Located in ☐ IRXCDProspect

Description *None*

Rule Type  Select Action

○ Select action rules return resources (items of content) from a resource collection based on a set of col... current application. You may also sort, randomize, and/or limit the number of results returned.

Select Web Content whose Location is Prospects and whose Name is current MySampleObject.myValue Edit

Fig. 3

SELECTION OF IMPLEMENTATION FOR QUERY EXECUTION

BACKGROUND

Aspects of the present invention relate to selecting an implementation for executing a query.

In certain client/user-server scenarios, a query may need to be invoked a multitude of times, for example, a user query to retrieve content for a page in a website. Such a query may return different results depending on a context in which the query is generated. Such a context may, for example, be: based on attributes of the user/client, their interests, role, permissions, etc. These are referred to sometimes as targeted or personalized results.

As each query execution event may generate different results, caching the query execution results may not always yield expected performance results, since the query may need to be re-executed frequently. So, for performance purposes, the focus is on the query itself. Ideally, it should be as optimized as possible for all the situations in which it may be executed. Depending on the circumstances, such as, for example, server load, data store size, user identity, role, access, etc. performance is expected to vary for query execution. This implies that a compromise may need to be made to obtain a single implementation that could be used for execution of a given query and whose corresponding performance record in this regard is such that it is considered to execute the query optimally/relatively better than other available implementations for all given circumstances.

Optimization of Extensible Markup language (XML) database queries may involve compiling an XML query into a query execution plan, which is then executed on an XML database. The compiled query may be optimized using some mechanisms, such as, for example, feeding the database statistics into the compiler so that it creates a query execution plan that best fits the database in its current state. Multiple versions of the query are subsequently generated. In this case, it is likely that the database statistics may not always be updated/current at the compile time of the XML query into a query execution plan, and thus, such compilation may be done based on stale statistics. Furthermore, since the input parameters are unavailable to the compiler at compile time, an optimized query execution plan is unlikely to be generated. The compiler may be configured to generate multiple execution plans for executing the same query. Which of the execution plans is used for query execution by the database management system is determined by dedicated code generated by the compiler for analyzing the input parameters and current database state. Such an analysis is then used for determining the optimum query execution plan to use.

Accordingly, it is a challenge to provide for query execution that may be performed with increased accuracy and conservation of processing resources.

SUMMARY

Shortcomings of the prior art are overcome and additional advantages are provided through the provision of a computer-implemented method of selecting at least an implementation for executing a query. The method includes, for instance, based on a query run request in respect of a given query, accessing query execution data including implementations and their respective performance records for executing the given query in a given context assessing the query execution data; and selecting at least an implementation on a basis of its respective performance record to execute the given query in at least a current context.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Reference will now be made, by way of example, to the accompanying drawings, in which.

DETAILED DESCRIPTION

Within the description, the same reference numerals or signs are used to denote the same parts or the like.

Figure 1:
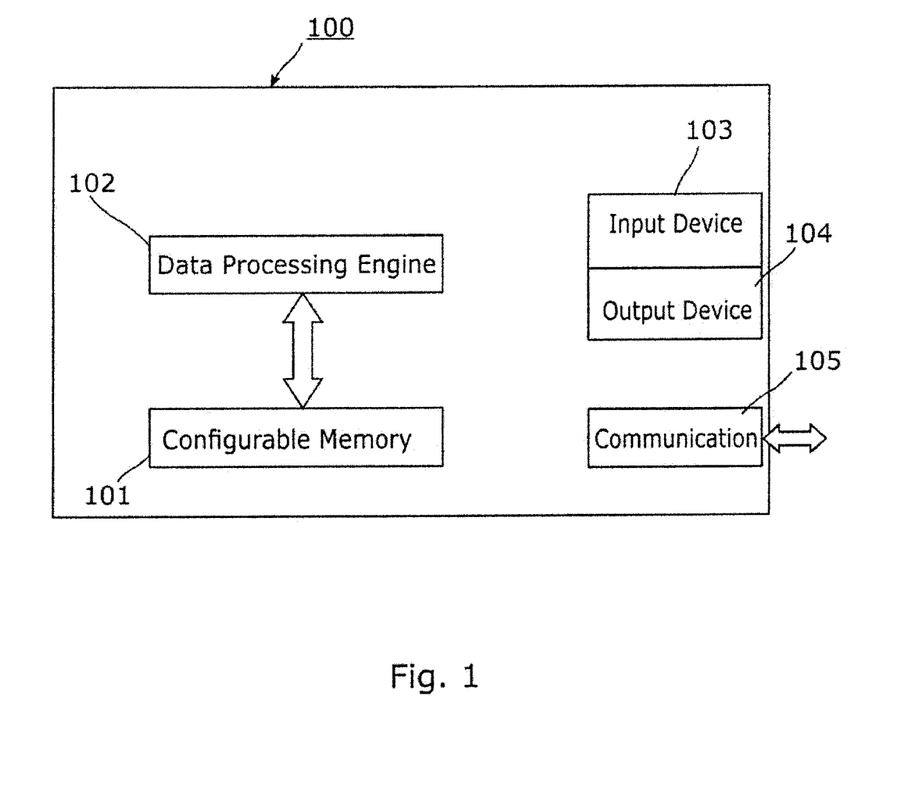
FIG. 1 illustrates an embodiment of a system aspect of the present invention.

Reference is now made to FIG. 1, which illustrates an embodiment of a system aspect 100 of the present invention comprising: a memory 101 that is configurable to store executable instructions, and at least a data processing engine 102 that is operatively coupled to the memory 101 and configurable to execute the instructions stored in the memory 101. The system aspect 100 may also generally comprise at least a user-accessible, input interface element 103 that may be used by the user to compile instructions for storage in the memory 101 and to facilitate user communication with the data processing engine 102, thereby to cause the data processing engine 102 to execute specific instructions stored in the memory 101. The memory 101, the data processing engine 102 and the user input interface element 103 may be operatively coupled to at least an output element 104. A communications channel 105 is also provided, in one embodiment, which may facilitate communication with other, externally provided devices and/or which may comprise at least a communication medium. Such a communication medium may, for example, generally be wireless media or wired media. In an embodiment of the present invention, the instructions that are stored in the memory 101, when executed by the data processing engine 102, facilitate selection of an implementation for executing a query.

Figure 2A:
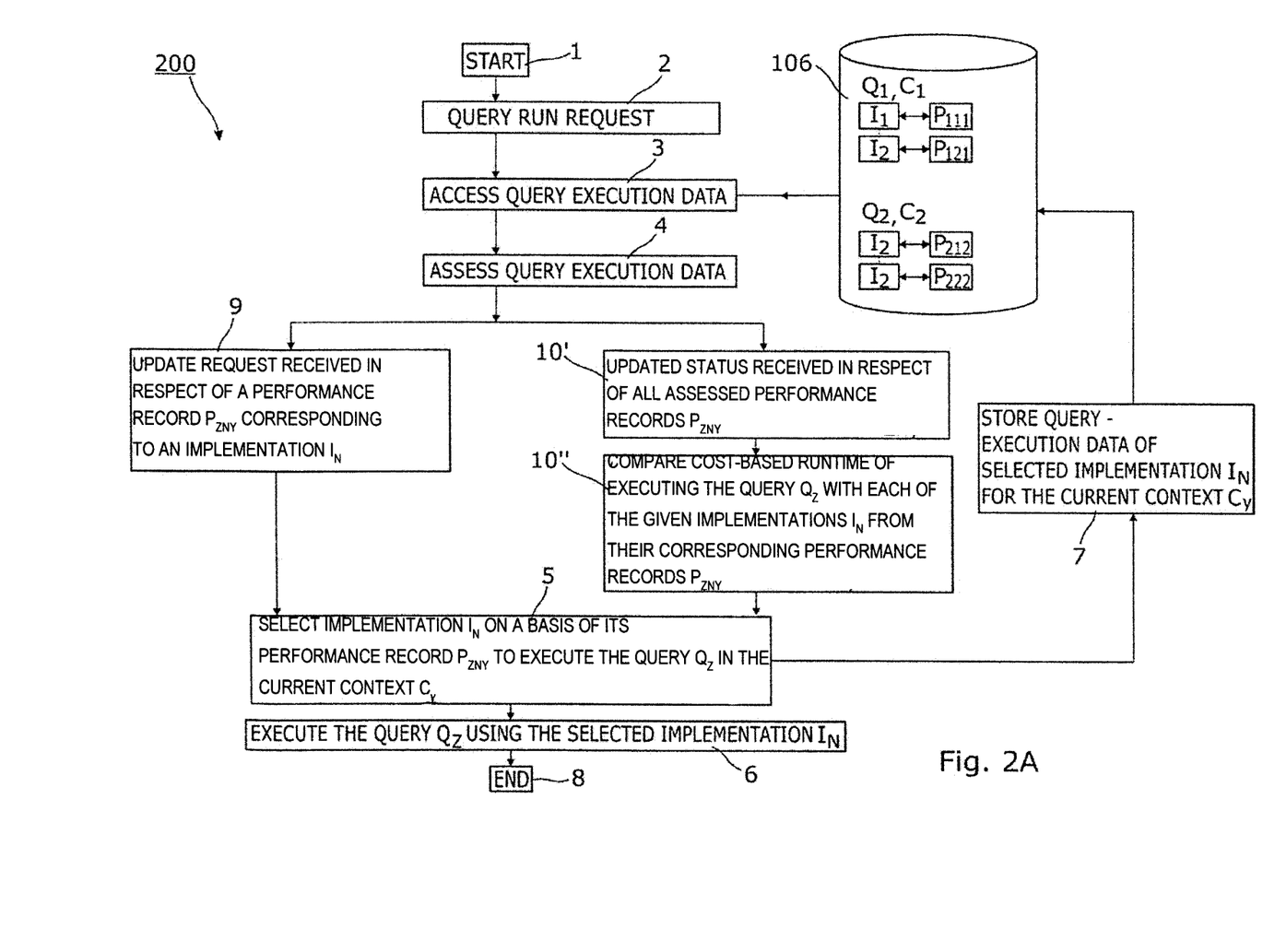
FIG. 2A is a flowchart of an embodiment of a method aspect of the present invention.

Reference is now made to FIG. 2A, which shows how an embodiment of a method aspect 200 of the present invention may be applied for selecting an implementation for execution of a given query. It starts at block 1. In response to a query run request being registered at block 2, query execution data is accessed at block 3 from a database 106. The database 106 may be a dedicated database and/or be integrated within the memory 101.

The query execution data comprises data on multiple implementations $I_1, I_2, \ldots I_N$, where N is any given integer, for executing different queries $Q_1, Q_2, \ldots Q_Z$, where Z is any given integer differentiating the different queries, in a given context $C_1, C_2, \ldots C_Y$, where Y is any given integer differentiating the different contexts. For a given query $Q_Z$ being executed using a given implementation $I_N$ in respect of a given context $C_Y$, the performance record $P_{ZNY}$ corresponding thereto is recorded. Thus, the query execution data in an embodiment of the present invention generally comprises data on a query $Q_1, Q_2, \ldots Q_Z$ to be executed, the given implementations $I_1, I_2, \ldots I_N$ that are used for its execution, a given context $C_1, C_2, \ldots C_Y$ in which the query $Q_1, Q_2, \ldots Q_Z$ is to be executed and data on the respective performance records $P_{ZNY}$ generated by executing the query $Q_1, Q_2, \ldots Q_Z$ with each of the given implementations $I_1, I_2, \ldots I_N$ in the given context $C_1, C_2, \ldots C_Y$.

Referring to FIG. 2A, in this specific example, the query execution data saved in the database 106 comprises data corresponding to: a query $Q_1$ being executed by implementations $I_1$ and $I_2$ in respect of a context $C_1$ and their respective performance records $P_{111}$ and $P_{121}$, and also to a query $Q_2$ being executed by implementations $I_1$ and $I_2$ in respect of a context $C_2$ and their respective performance records $P_{212}$ and $P_{222}$. However, an embodiment of the present invention is, of course, not limited to any given query being performed only in respect of a specific context using the different implementations. Data corresponding to respective performance records $P_{ZNY}$ on any executable query $Q_1, Q_2, \ldots Q_Z$ executed by using the different implementations $I_1, I_2, \ldots I_N$ in respect of any given context $C_1, C_2, \ldots C_Y$ is collected in an embodiment of the present invention. So turning to FIG. 2A again, and by way of example, query execution data may also be held on: a query $Q_1$ being executed by implementations $I_1$ and $I_2$ in respect of a context $C_2$ and their respective performance records $P_{112}$ and $P_{122}$, and also to a query $Q_2$ being executed by implementations $I_1$ and $I_2$ in respect of a context $C_1$ and their respective performance records $P_{211}$ and $P_{221}$.

The accessed query execution data is assessed at block 4. This is done to facilitate, at block 5, a selection of an implementation $I_N$, on a basis of its corresponding performance record $P_{ZNY}$, to execute the given query $Q_Z$ in a current, specified context $C_Y$. At block 6, the given query $Q_Z$ is executed using the selected implementation IN in the current context $C_Y$. The query execution data corresponding to the selected implementation $I_N$ that is used for executing the given query $Q_Z$ and contextual data on the current context CY are then stored away for future use at block 7. At block 8, an embodiment according to a method aspect 200 of the present invention ends.

In the assessment of the query execution data that is done at block 4, at least an update status of each of the performance records $P_{ZNY}$ corresponding to the implementations $I_N$ available for executing the given query $Q_Z$ in respect of the current context $C_Y$ is determined. In response to a performance record $P_{ZNY}$ being identified as needing updating from the assessment of the query execution data conducted at block 4, an update request is returned at block 9 in respect of that performance record $P_{ZNY}$. The performance record $P_{ZNY}$ is updated and the implementation $I_N$ corresponding thereto is selected at block 5 for executing the given query $Q_Z$ in the current context $C_Y$. Alternatively, in response to it being determined that the performance records $P_{ZNY}$ are in an updated form from the assessment of the query execution data conducted at block 4, an updated status is returned at block $10^I$ in respect of those performance records $P_{ZNY}$. A cost-based runtime of executing the given query $Q_Z$ in respect of the current context $C_Y$ with each of the implementations $I_N$ corresponding to the performance records $P_{ZNY}$ flagged as being in an updated form is compared at block $10^{II}$. Following on from block $10^{II}$, the implementation $I_N$ that is selected for executing the given query $Q_Z$ in the current context $C_Y$ at block 5 may be chosen on account of having the shortest runtime from the comparison done at block $10^{II}$. Generally, in an embodiment of the present invention, selection of the implementation $I_N$ at block 5 is done on account of having a corresponding performance record $P_{ZNY}$ that is optimum and/or that makes it well-suited for executing the given query $Q_Z$ in the current context $C_Y$ over all other available implementations $I_N$. The current context $C_Y$, or indeed any context $C_Y$, in an embodiment of the present invention may be user-specified and may, for example, comprise so-called targeted or personalized results relating to a user such as, for example, based on attributes of the user, their interests, roles, permissions, a time of day, server load, or any combination thereof. A current context $C_Y$ may generally be taken to be at least a state/condition in which a given query $Q_Z$ is executed by at least a given implementation $I_N$ in an embodiment of the present invention.

An embodiment of the method aspect 200 of the present invention also comprises compiling run statistics data. The query execution data that is accessed at block 3 and assessed at block 4 in order to facilitate selection of the implementation $I_N$ that is used for executing the given query $Q_Z$ in the current context $C_Y$ at block 5 may be generated during compilation of such run statistics data. In this regard, reference is now made to FIG. 2B, which shows a flowchart of how run statistics data may be generated in an embodiment of the present invention.

Figure 2B:
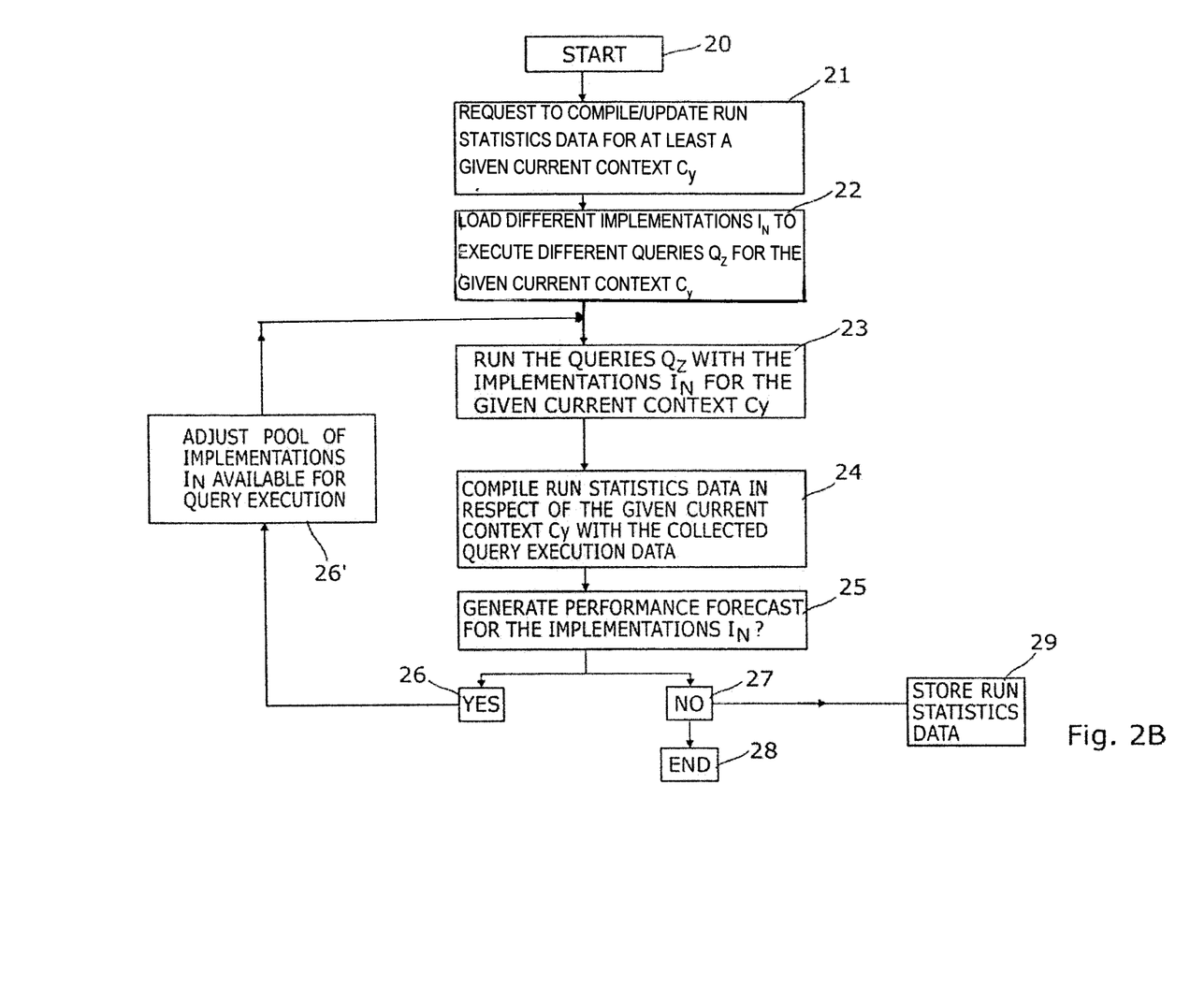
FIG. 2B is a flowchart illustrating how run statistics data may be generated in an embodiment of the present invention.

Compilation of the run statistics data is initiated at block 20. In response to a request to compile the run statistics data in respect of a given current context $C_Y$ being registered at block 21, different implementations $I_N$ for executing different queries $Q_Z$ are loaded, at block 22, from an available pool of implementations $I_N$ for query execution. At block 23, the different queries $Q_Z$ are executed with the loaded implementations $I_N$ in respect of at least a given condition and/or the given current context $C_Y$. Such conditions may, for example, be: system load, time of day, stored content or any combination thereof. As mentioned previously, the given current context $C_Y$ is the context in which live-operation of an embodiment of the present invention is performed for compiling the run statistics data, that is, for example, the state/context present when an embodiment of the present invention is operated when the request for compiling the run statistics data is received at block 21. The query execution data generated from such query execution in the given current context $C_Y$ at block 23 is used to compile the run statistics data at block 24. At block 25, a query on whether or not to generate a performance forecast in respect of the different implementations $I_N$ used for compiling the run statistics data at block 22 is generated. In response, a performance forecast may be generated at block 26 and used at block $26^I$ for adjusting the pool of implementations $I_N$ made available for query execution at block 22. Alternatively, a performance forecast is not requested and an embodiment of the present invention proceeds via block 27 to block 28 where a no-further action stamp is generated and compilation of the run statistics data is ended. The compiled run statistics data is stored at block 29, this being done in such a way that it is accessible with relative ease at block 3 of FIG. 2A; it is desirably stored in the database 106 shown in FIG. 2A.

Returning to FIG. 2A, the query execution data that is accessed at block 3 and assessed at block 4, thereby to facilitate selection of the implementation $I_N$ that is used for executing the given query $Q_Z$ in the current context $C_Y$ at block 5, comprises the run statistics data, which may be collected as described, by way of example, with reference to FIG. 2B, in an embodiment of the present invention. In this regard, and as can be clearly seen by viewing FIG. 2A in conjunction with FIG. 2B, the compiled run statistics data, which is stored at block 29 in FIG. 2B, comprises query execution data, that may be accessed at block 3 in FIG. 2A and subsequently used for selecting an implementation $I_N$ that is used for executing the given query $Q_Z$ in the specified, current context $C_Y$.

The run statistics data may be maintained in an updated form. The run statistics data is updated in respect of a given current context $C_Y$ of an embodiment of the present invention; for example, the context $C_Y$ when an update request for the run statistics data is received at block 21. There are certain mechanisms by way of which this may be done in an embodiment of the present invention and are discussed below.

Updating of the run statistics data is configurable to be user-driven or automatically performed. So, a request for updating the compiled run statistics data may be received at block 21 in FIG. 2B and may be generated by a user or automatically generated after a given time-period.

Updating of the run statistics data may be done in respect of different implementations $I_N$ being used for executing different queries $Q_Z$ for a given current context $C_Y$ and by specifying at least one of: a configurable time-period; a configurable frequency and at least a configurable variable. In this regard, and by way of example, the compilation of the run statistics data, as described with reference to FIG. 2B, may be done by using an available pool of implementations $I_N$ to execute different queries $Q_Z$ with a frequency of every few hours in a day over a time-period of a month and in respect of a specified condition and/or given current context $C_Y$.

Additionally, the query execution data stored at block 7, arising from a live operation of an embodiment of the present invention, as described with reference to FIG. 2A, may also be registered in the run statistics data, this being done for the query execution data having been generated in the same given current context in which the run statistics data may have been compiled, thereby serving to also indirectly update the run statistics data.

Bringing the discussions relating to FIGS. 2A and 2B together, in an embodiment of the present invention, multiple implementations $I_N$ of a query $Q_Z$ are facilitated; they may be provided by a user, as desired. The implementations $I_N$ each have the same input defined by input parameters that may be user-supplied and the same output of expected results. Selection of the implementation IN that is used for executing a given query $Q_Z$ in respect of a current context $C_Y$ is done on a basis of it corresponding performance record $P_{ZNY}$ in respect of that current context $C_Y$. In this regard, and by way of example, a performance record $P_{ZNY}$ of a given implementation $I_N$ may comprise a runtime of executing the given query $Q_N$ in at least a given current context $C_Y$ corresponding to the current context $C_Y$. The cost of executing the given query $Q_N$ with each of the multiple implementations $I_N$ available for this purpose in respect of the current context $C_Y$ is assessed and the implementation $I_N$ having, for example, a lowest associated runtime for executing the given query $Q_Z$ in respect of the current context $C_Y$ in full may be selected. The performance of an implementation $I_N$ in respect of query execution is, of course, not limited to a query execution runtime and may be any other suitable parameter(s) within the ambit of an embodiment of the present invention. In this way, an implementation $I_N$ for query execution is dynamically selected in a current context $C_Y$ and/or live operation of/running an embodiment of the present invention.

As discussed by referring to FIG. 2B, in an embodiment of the present invention, run statistics data are compiled, over time, for a respective performance of different implementations $I_N$ executing different queries $Q_Z$ for at least a given condition and/or a given current context $C_Y$. Such run statistics data is maintained in an updated form as discussed hereinabove. Referring to FIG. 2A, the run statistics data is fed back in an embodiment of the present invention, forming the basis of the query execution data of each of the implementations $I_N$ that are accessed at block 2 and assessed at block 3, thereby to facilitate selection of the implementation IN that is used for executing the given query $Q_Z$ in the current context $C_Y$ at block 5. Thus, selection of the implementation $I_N$ that is used for query execution in respect of least a given context $C_Y$ is done on the basis of updated performance records $P_{ZNY}$ maintained on the different implementations $I_N$ that may be used for executing that query $Q_Z$ and not on stale statistics and/or by analyzing input parameters values and a current state of a database in which such implementations $I_N$ may be stored. An implementation $I_N$ may only be selected on the basis of having a corresponding performance record $P_{ZNY}$ that reflects it is optimally suitable for executing a given query $Q_Z$ in respect of a current context $C_Y$ over all other available implementations $I_N$.

As discussed earlier, the run statistics data is collected in respect of at least a given current context $C_Y$. Such run statistics data forms the basis of selection of an implementation $I_N$ for query execution when the current context $C_Y$, during which such selection is performed, corresponds to the given current context $C_Y$ in which the run statistics data is compiled.

It may be that, over most given time-periods of operating an embodiment of the present invention, some implementations $I_N$ perform relatively well or poorly for query execution, under all conditions and/or contexts $C_Y$, compared to other implementations $I_N$. They may be identified from the run statistics data, particularly the performance forecast generated at block 26 in FIG. 2B and used to adjust the pool of implementations $I_N$ available for query execution in an embodiment of the present invention operated as described with reference to FIG. 2A. For example, the pool of implementations $I_N$ may be adjusted, automatically or by a user, by removing any implementation(s) $I_N$ identified as consistently poorly performant for any given condition(s) and/or context(s) $C_Y$.

An implementation $I_N$ may or may not be suitable for executing a given query $Q_Z$ for a specified condition and/or context $C_Y$. Its performance in this regard can be determined from the run statistics data. Processing resources may be directed for the compilation of run statistics data over a configurable time-period with a configurable frequency in order to collect updated performance records $P_{ZNY}$ of implementations $I_N$ that may be used for executing given queries $Q_Z$ in given conditions and/or at least a given current context $C_Y$. Compilation of the run statistics data is ideally not done every time an embodiment of the present invention is operated; when the run statistics data is in a compiled form, the implementation $I_N$ that is considered to have a corresponding performance record $P_{ZNY}$ making it the most performant from all available implementations $I_N$ for executing a given query $Q_Z$ in respect of a current operation of an embodiment of the present invention is used. It is configurable how and when the other available implementations $I_N$ may be used for query execution.

A frequency with which the run statistics data may be collected is adjustable and may be increased for query execution in a condition and/or context $C_Y$, which has not been registered before. In this way, the implementation $I_N$ that is considered to have a corresponding performance record $P_{ZNY}$ making it the most performant from all available implementations $I_N$ for query execution in the newly-registered condition and/or context $C_Y$ is selected.

It could be that a less performant implementation $I_N$ is used for query execution in an embodiment of the present invention. This should not be a problem provided the frequency with which this occurs is relatively low. This issue may be further addressed by compilation of the run statistics data being configurable to be user-driven or automatically performed. Thus, if it is registered that a less performant implementation $I_N$ has been used for query execution, an update of the run statistics data is performed by the request for compilation of the run statistics data at block 21 being generated by the user or automatically, thereby forcing some test runs and so updating the runtime statistics data.

Figure 3:
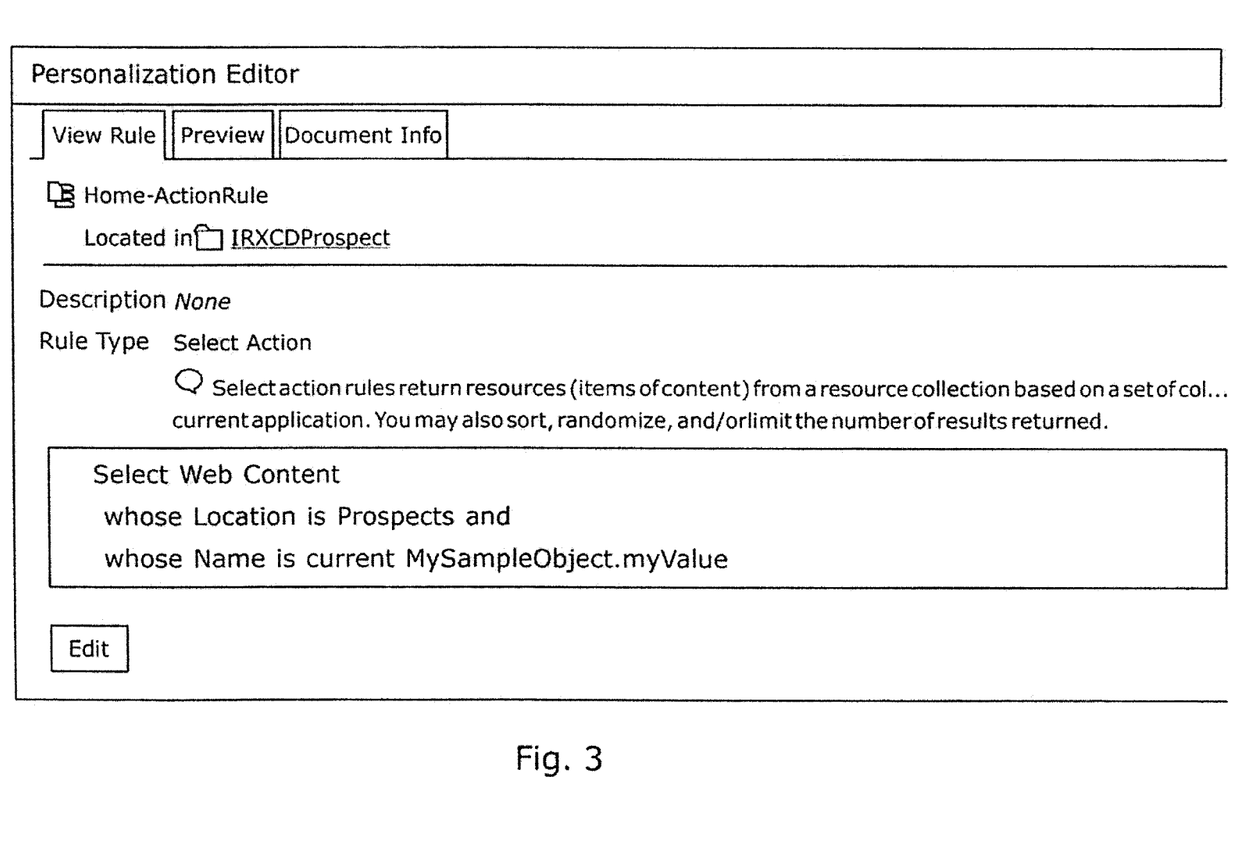
FIG. 3 is a screenshot of a computer monitor illustrating an example of a query that may be created by a user in a real-life scenario.

Reference is now made to FIG. 3, which is a screenshot of a computer monitor illustrating an example of a query that may be created by a user in a real-life scenario. By way of example, and with reference being made to FIG. 3, a user may wish to create a query $Q_Z$ that searches a certain web content library called, "Web Content" for content located in a certain folder called, "Prospects", and with names that match a value returned by a dynamic application object named, "current,MysampleObject.myValue". One implementation $I_N$ of this query $Q_Z$ is shown in the screenshot of FIG. 3. The same result can be reached by breaking the query $Q_Z$ into two queries $Q_Z$, one nested or called by the other. For example, a "Rule 1" may be created and used as a filter in "Rule 2" as follows:

Rule 1:
Select Web Content
whose Name is currentMysampleObject.myValue
Rule 2:
Select Web Content
whose Location is Prospects
Include Only Rule 1

This implementation $I_N$ will cause "Rule 2" to run, return all content in the "Prospects" folder and then pass these results to the nested rule, "Rule 1", which will process each result entry and filter out any entry that does not match the criteria of "Rule 1", i.e. remove entries from the results set that do not have the required name. The filtered results are then returned to the caller of "Rule 1".

It would be reasonable to assume that the first implementation IN that is shown in FIG. 3 should perform as well, and possibly better, than the second implementation $I_N$ discussed hereinabove. However, it turns out that the second implementation $I_N$ returns more accurate results and in a shorter time than the first implementation $I_N$. It is relatively quicker because of some system-based optimizations, mainly caching of the results returned by "Rule 2", but other factors may also be at play that may not be obvious to the user.

FIG. 3 illustrates a relatively simple scenario of a query/rule created by a user. In real-life, operational scenarios, the queries created by users are typically much more complex. Thus, query implementation may also be relatively complex and this may pose a challenge to users and/or query writers to write a query that matches given requirements. This problem may be further exacerbated due to their being multiple possible implementations for any given query in a real-life scenario and query execution with any implementation may be context and/or condition driven—in the example of FIG. 3, only two implementations were discussed. In this regard, an embodiment of the present invention is particularly attractive since it allows the user to add as many implementations $I_N$ of the query $Q_Z$ as desired, and the most performant of the implementations $I_N$ is then selected for execution of the query $Q_Z$ in a given context $C_Y$. An embodiment of the present invention may be applied to addressing the potential complexity of query/rule authoring met in real-life operational scenarios.

As described herein, according to an embodiment of an aspect of the present invention, there is provided a computer-implemented method for selecting at least an implementation for executing a query comprising: in response to a query run request in respect of a given query, accessing query execution data comprising implementations and their respective performance records for executing the given query in a given context; assessing the query execution data; and selecting at least an implementation on a basis of its respective performance record to execute the given query in at least a current context.

In an embodiment of the present invention, and in contrast to query execution being performed by optimizing a given query, multiple implementations for executing a given query are provided. Each implementation has a corresponding: execution plan for executing the query, and a performance record on execution of the query in at least a given context. Out of the multiple implementations, one is selected on a basis of its respective performance record for execution of the query in a current context of operation of an embodiment of the present invention. The selected implementation for execution of a given query is chosen on account of being most performant out of all implementations available for query execution for the aforementioned current context. So, it may be the same for execution of the query in at least one context or for different contexts, or it may be different for different contexts. This feature may impart versatility and/or accuracy to an embodiment of the present invention. Some further features that may also do so include: multiple implementations may be provided by a user, as desired, and tested on a basis of their respective performance record for ultimate selection in executing a given query, and a performance record of a given implementation may be assessed in terms of the context in which the query is expected to be executed, i.e. the current context. Features of an embodiment of the present invention may serve to make it particularly attractive for application in database querying mechanisms.

An embodiment of the present invention may comprise: compiling run statistics data by collecting query execution data on different queries being executed with different implementations in respect of at least a given current context over a configurable time-period, at a configurable frequency, in respect of at least a configurable variable; using the run statistics data to select the implementation for executing the given query when the current context corresponds to the given current context in respect of which the run statistics data has been compiled, and updating the run statistics data with query execution data generated from any executed query. In an embodiment of the present invention, run statistics data is used for selecting an implementation out of multiple available implementations for executing a query in a current context of operation of an embodiment of the present invention. The run statistics data is based on executing a given query, using a pool of implementations available for this purpose and/or provided by a user, in full, for a given current context, that is, the context in which live-operation of an embodiment of the present invention is performed for compiling the run statistics data. Run statistics data collected in this way forms the basis of selecting an implementation for executing a query in respect of a current context, the current context corresponding to the given current context in respect of which the run statistics data is collected for execution of the requested query. So, selection of an implementation for executing a given query is not done on a basis of test runs on a test system, which may yield results of reduced accuracy. Furthermore, this may be done over a configurable time-period, at a configurable frequency, in respect of at least a configurable variable such as, for example, at least a given condition. So, the run statistics data may be maintained in an updated form/refreshed instead of being used in a stale form for selection of an implementation for query execution. Taken individually or in combination, these features may extend the advantages of improved flexibility and/or accuracy to an embodiment of the present invention.

In one aspect, in response to an update request being returned in respect of at least a performance record from the assessment of the query execution data, a given implementation corresponding to that performance record is selected to execute the given query in the current context. The performance record is updated and the implementation corresponding thereto is selected for execution of the query in the current context. The query execution data corresponding to such an implementation, including its updated performance record, is saved and used for compiling and/or updating run statistics data, which is used in the future selection of implementations for executing a given query in a given condition and/or context. Thus, this feature may extend the advantage of improved accuracy of implementation selection for query execution to an embodiment of the present invention.

In one aspect, in response to an updated status being returned in respect of the performance records from the assessment of the query execution data, comparing at least a cost-based runtime of executing the given query with each of the implementations from their respective performance records, and using this comparison to select the implementation for executing the given query in the current context. Generally, in an embodiment of the present invention, an implementation is selected for query execution on account of having a corresponding performance record that is optimum and/or that makes it well-suited for executing a given query in a given condition and/or context over all other available implementations. In this regard, the performance of a given implementation may be measured by the time it takes to execute a given query in full for a given/current context. By recording a respective cost of running a given query in full with different implementations in respect of a given condition and/or context and comparing such runtimes, a selection can be made of a given implementation with the lowest runtime for executing the query. Because the performance records are generated during live runs of query execution performed in response to a query execution request and/or for compilation of run statistics data, they are in an updated form. Unlike for previously-proposed art, stale statistics and/or a current state of a database is not used for query execution. Thus, this feature may extend the advantage of increased accuracy to an embodiment of the present invention. Furthermore, processing resources may be conserved since selection of an implementation for query execution is done without relying on generating dedicated code.

An embodiment of the present invention further includes generating at least a performance forecast in respect of any executable query for at least an implementation, and adjusting at least an available pool of implementations for query execution according to the performance forecast. It may be that, over most given time-periods of operating an embodiment of the present invention, some implementations perform relatively well or poorly for query execution, under all conditions and/or contexts, compared to other implementations. They may be identified by generating a performance forecast from the run statistics data. The performance forecast may be used to adjust the pool of implementations available for query execution. Such adjustment may be done automatically or by a user. It may entail removing any implementation(s) identified as consistently poorly performant from the performance forecast for any given condition(s) and/or context(s). In this way, the processing resources of an embodiment of the present invention may be conserved and prudently used.

According to an embodiment of a further aspect of the present invention, there is provided a system for selecting at least an implementation for executing a query comprising: a memory configurable to store executable instructions; a data processor operatively coupled to the memory, the data processor being configurable to execute the instructions stored in the memory, thereby to: in response to a query run request in respect of a given query, access query execution data comprising implementations and their respective performance records for executing the given query in a given context; assess the query execution data, and select at least an implementation on a basis of its respective performance record to execute the given query in at least a current context.

All the advantages of any one of the features of an embodiment of the method aspect of the present invention are also imparted to an embodiment of the system aspect.

According to an embodiment of a further aspect of the present invention, there is provided a computer program product for selecting at least an implementation for executing a query, the computer program product comprising a computer readable storage medium having program instructions embodied therewith, the program instructions executable by a processor to cause the processor to: in response to a query run request in respect of a given query, accessing query execution data comprising implementations and their respective performance records for executing the given query in a given context; assessing the query execution data, and selecting at least an implementation on a basis of its respective performance record to execute the given query in at least a current context.

All the advantages of any one of the features of an embodiment of the method aspect of the present invention are also imparted to an embodiment of the computer program aspect.

Aspects of the present invention have been described purely by way of example and modifications of detail may be made within the scope of the invention.

Each feature disclosed in the description and, where appropriate, the claims and drawings may be provided independently or in any appropriate combination.

Aspect of the present invention may be a system, a method and/or a computer program product at any possible technical level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable storage instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages including an object oriented program language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Features of an embodiment of one aspect of the present invention may be applied to any other aspect and vice versa.

In any of the above aspects, the various features may be implemented in hardware or as software modules running on one or more data processors.

What is claimed is:

1. A computer-implemented method of selecting at least an implementation for executing a query comprising:
    compiling run statistics data by collecting query execution data on different queries executed with different implementations, wherein each implementation of the different implementations has a common input defined by input parameters and a common output of expected responsive query results and a different output of expected performance results, wherein responsive query results comprise data sets responsive to the different queries and performance results comprise statistics characterizing execution of the different queries by the different implementations, the performance results comprising performance records for the different implementations, in respect of a given context, over a configurable time-period, at a configurable frequency, in respect of at least a configurable variable, wherein the different implementations each comprise a query execution plan and a performance record on query execution in the given context, wherein executing the different queries in the given context produces responsive query results targeted to users initiating run requests for the different queries, for each of the different queries, based on the given context;

based on a query run request by a specific user in respect of a given query, at runtime, accessing the query execution data comprising the implementations and their respective performance records for executing the given query in the given context, wherein the given context is user-specified, and wherein executing the query in the given context produces responsive query results targeted to the specific user associated with a call to execute the given query, wherein the targeted query results are based on a role of the specific user, and wherein the given query returns different responsive query results based on the given context, wherein the given context affects generation of the query and execution of the query, and wherein the given context comprises the role of the specific user and a condition selected from the group consisting of: system load, time of day, and stored content, and wherein executing the query in the given context produces personalized responsive query results for the query, based on the given context;

assessing the query execution data;

selecting at least an implementation on a basis of its respective performance record to execute the given query in the given context, wherein the selecting comprises using the run statistics data to select the implementation for executing the given query based on a current context corresponding to the given current context in respect of which the run statistics data has been compiled; and executing the given query in the selected implementation, in the current context.

2. The computer-implemented method of claim 1, further comprising:
updating the run statistics data with query execution data generated from an execution of the given query.

3. The computer-implemented method of claim 1, wherein, based on an update request being returned in respect of at least a performance record from the assessment of the query execution data, a given implementation corresponding to that performance record is selected to execute the given query in the current context.

4. The computer-implemented method of claim 1, further comprising:
based on an updated status being returned in respect of the performance records from the assessment of the query execution data, comparing at least a cost-based runtime of executing the given query with each of the implementations from their respective performance records; and
using the comparison to select the implementation for executing the given query in the current context.

5. The computer-implemented method of claim 1, further comprising:
generating at least a performance forecast in respect of an executable query for at least an implementation; and
adjusting at least an available pool of implementations for query execution according to the performance forecast.

6. A computer system for selecting at least an implementation for executing a query comprising:
a memory; and
a processor in communication with the memory, wherein the computer system is configured to perform a method, said method comprising:
compiling run statistics data by collecting query execution data on different queries executed with different implementations, wherein each implementation of the different implementations has a common input defined by input parameters and a common output of expected responsive query results and a different output of expected performance results, wherein responsive query results comprise data sets responsive to the different queries and performance results comprise statistics characterizing execution of the different queries by the different implementations, the performance results comprising performance records for the different implementations, in respect of a given context, over a configurable time-period, at a configurable frequency, in respect of at least a configurable variable, wherein the different implementations each comprise a query execution plan and a performance record on query execution in the given context, wherein executing the different queries in the given context produces responsive query results targeted to users initiating run requests for the different queries, for each of the different queries, based on the given context;

based on a query run request by a specific user in respect of a given query, at runtime, accessing the query execution data comprising the implementations and their respective performance records for executing the given query in the given context, wherein the given context is user-specified, and wherein executing the query in the given context produces responsive query results targeted to the specific user associated with a call to execute the given query, wherein the targeted query results are based on a role of the specific user, and wherein the given query returns different responsive query results based on the given context, wherein the given context affects generation of the query and execution of the query, and wherein the given context comprises the role of the specific user and a condition selected from the group consisting of: system load, time of day, and stored content, and wherein executing the query in the given context produces personalized responsive query results for the query, based on the given context;

assessing the query execution data;

selecting at least an implementation on a basis of its respective performance record to execute the given query in the given context, wherein the selecting comprises using the run statistics data to select the implementation for executing the given query based on a current context corresponding to the given current context in respect of which the run statistics data has been compiled; and executing the given query in the selected implementation, in the current context.

7. The computer system of claim 6, wherein the method further comprises:

updating the run statistics data with query execution data generated from an execution of the given query.

8. The computer system of claim 6, wherein, based on an update request being returned in respect of at least a performance record from the assessment of the query execution data, a given implementation corresponding to that performance record is selected to execute the given query in the current context.

9. The computer system of claim 6, wherein the method further comprises:

based on an updated status being returned in respect of the performance records from the assessment of the query execution data, comparing at least a cost-based runtime of executing the given query with each of the implementations from their respective performance records; and using the comparison to select the implementation for executing the given query in the current context.

10. The computer system of claim 6, wherein the method further comprises:

generating at least a performance forecast in respect of an executable query for at least an implementation; and adjusting at least an available pool of implementations for query execution according to the performance forecast.

11. A computer program product for selecting at least an implementation for executing a query comprising:

a computer readable storage medium readable by a processing circuit and storing instructions for execution by the processing circuit for performing a method comprising:

compiling run statistics data by collecting query execution data on different queries executed with different implementations, wherein each implementation of the different implementations has a common input defined by input parameters and a common output of expected responsive query results and a different output of expected performance results, wherein responsive query results comprise data sets responsive to the different queries and performance results comprise statistics characterizing execution of the different queries by the different implementations, the performance results comprising performance records for the different implementations, in respect of a given context, over a configurable time-period, at a configurable frequency, in respect of at least a configurable variable, wherein the different implementations each comprise a query execution plan and a performance record on query execution in the given context, wherein executing the different queries in the given context produces responsive query results targeted to users initiating run requests for the different queries, for each of the different queries, based on the given context;

based on a query run request by a specific user in respect of a given query, at runtime, accessing the query execution data comprising the implementations and their respective performance records for executing the given query in the given context, wherein the given context is user-specified, and wherein executing the query in the given context produces responsive query results targeted to the specific user associated with a call to execute the given query, wherein the targeted query results are based on an a role of the specific user, and wherein the given query returns different responsive query results based on the given context, wherein the given context affects generation of the query and execution of the query, and wherein the given context comprises the attribute or the role of the specific user and a condition selected from the group consisting of: system load, time of day, and stored content, and wherein executing the query in the given context produces personalized responsive query results for the query, based on the given context;

assessing the query execution data;

selecting at least an implementation on a basis of its respective performance record to execute the given query in the given context, wherein the selecting comprises using the run statistics data to select the implementation for executing the given query based on a current context corresponding to the given current context in respect of which the run statistics data has been compiled; and executing the given query in the selected implementation, in the current context.

12. The computer program product of claim 11, wherein the method further comprises:

updating the run statistics data with query execution data generated from an execution of the given query.

13. The computer program product of claim 11, wherein, based on an update request being returned in respect of at least a performance record from the assessment of the query execution data, a given implementation corresponding to that performance record is selected to execute the given query in the current context.

14. The computer program product of claim 11, wherein the method further comprises:

based on an updated status being returned in respect of the performance records from the assessment of the query execution data, comparing at least a cost-based runtime of executing the given query with each of the implementations from their respective performance records; and using the comparison to select the implementation for executing the given query in the current context.

15. The computer program product of claim 11, wherein the method further comprises:

generating at least a performance forecast in respect of an executable query for at least an implementation; and adjusting at least an available pool of implementations for query execution according to the performance forecast.

* * * * *